US007477630B2

(12) United States Patent
Kim et al.

(10) Patent No.: US 7,477,630 B2
(45) Date of Patent: Jan. 13, 2009

(54) TRANSMISSION CONTROLLER USED IN MEDIA ACCESS CONTROL PROCESSING APPARATUS AND TRANSMISSION CONTROLLING METHOD THEREOF

(75) Inventors: Sung-Won Kim, Seoul (KR); Kyoung-Ju Noh, Daejon (KR); Young-Ae Chun, Daejon (KR); Jea-Young Ahn, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1150 days.

(21) Appl. No.: 10/745,740

(22) Filed: Dec. 23, 2003

(65) Prior Publication Data

US 2004/0136390 A1 Jul. 15, 2004

(30) Foreign Application Priority Data

Dec. 27, 2002 (KR) ...................... 10-2002-0084733

(51) Int. Cl.
*H04Q 7/24* (2006.01)
(52) U.S. Cl. ...................................... 370/338; 370/412
(58) Field of Classification Search ........................ None
See application file for complete search history.

(56) References Cited

U.S. PATENT DOCUMENTS

| | | | | |
|---|---|---|---|---|
| 6,804,222 B1* | 10/2004 | Lin et al. | ...................... | 370/338 |
| 6,990,116 B1* | 1/2006 | Young et al. | ................ | 370/445 |
| 7,027,462 B2* | 4/2006 | Benveniste | ................... | 370/447 |
| 2002/0089994 A1* | 7/2002 | Leach et al. | ................. | 370/412 |
| 2003/0109259 A1* | 6/2003 | Jang | ........................... | 455/451 |
| 2003/0231608 A1* | 12/2003 | Wentink | ..................... | 370/338 |
| 2005/0068924 A1* | 3/2005 | Lindskog et al. | ............ | 370/338 |

FOREIGN PATENT DOCUMENTS

| | | |
|---|---|---|
| KR | 2000-14992 | 3/2000 |
| KR | 2001-38486 | 5/2001 |
| KR | 2002-49786 | 6/2002 |

* cited by examiner

*Primary Examiner*—Wing F Chan
*Assistant Examiner*—Eunsook Choi
(74) *Attorney, Agent, or Firm*—Blakely, Sokoloff, Taylor & Zafman

(57) ABSTRACT

A transmission controller used in a media access controlling (MAC) processing apparatus and a transmission controlling technique. The transmission controller includes a transmission frame sorting unit for sorting out transmission frames transmitted from an LLC layer based on each transmission service and requesting control of the transmission frames and a transmission queue controlling unit for requesting to store the transmission frames, information on the transmission frames, and controlling the transmission of the transmission frames. The transmission controller includes a transmission queue storing unit for storing information on the sorting of the transmission frames based on each transmission service or each mobile terminal and a frame controlling unit for storing the transmission frames, generating and storing CF POLL frames, and transmitting the transmission frames and the CF POLL frames to a wireless physical layer. The transmission controller includes a shared transmission frame storing unit and a CF POLL frame storing unit.

15 Claims, 10 Drawing Sheets

TRANSMISSION CONTROLLER USED IN MEDIA ACCESS CONTROL PROCESSING APPARATUS AND TRANSMISSION CONTROLLING METHOD THEREOF

FIELD OF THE INVENTION

The present invention relates to an apparatus for processing media access control of an access point; and, more particularly, to a transmission controller of a media access control (MAC) processing apparatus which transmits transmission frames by storing the transmission frames in a shared frame buffer dynamically, classifying them according to each service type, and queuing them to a multiple-queue, and a method of the transmission controller.

DESCRIPTION OF RELATED ART

According to architecture-based standards recommended by the Institute of Electrical and Electronics Engineers (IEEE) 802.11a, there are two types of wireless LAN protocols: Physical layer protocol and media access control (MAC). The MAC protocol controls user's authority for a transmission media shared by a plurality of users.

The MAC protocol recommended by the IEEE 802.11a is a carrier sense multiple access with collision avoidance (CSMA/CA) protocol. It is different from a conventional carrier sense multiple access with collision detection (CSMA/CD) technology using a wired LAN. Since the wireless communication cannot detect collision between packets, which is different from the wired communication, it requires the CSMA/CA technology to avoid packet collision.

The MAC protocol recommended by the IEEE 802.11a is designed to process both contention service and contention-free service. The contention service is a common computer communication which is an asynchronous data service such as a transmission of a file. The contention service is processed by a distributed coordination function (DCF) and provided based on the CSMA/CA technology.

The contention-free service is sensitive to delay in transmission, such as voice data and pictures. The contention-free service is processed by a point coordination function (PCF).

The DCF, which is based on contention transmission, is divided into a common transmission service, power-saving (PS) transmission service to a mobile terminal which is in a PS mode, and a broadcast/multicast transmission service.

The common transmission service uses the CSMA/CA technology to prevent collision caused by simultaneous multiple-access of the users to one channel and minimize channel consumption. The CSMA/CA technology includes clear channel assessment (CCA) system, which detects the channel condition, idle or busy, in the physical layer and informs an MAC layer of the detected channel condition, and network allocation vector (NAV) system, which prevents other mobile terminals from transmitting frames by registering a channel using time of a mobile terminal which is transmitting frames in a duration field of a transmission frame.

In the PS-mode transmission service, when a frame for a PS mobile terminal to a mobile terminal which is in a PS mode arrives at an access point, the mobile terminal is informed that there is a frame to be transmitted to itself by reserving a bit for a traffic indication message (TIM). The mobile terminal reads the TIM and notifies the access point that it is ready for receiving the frame by transmitting a PS POLL frame to the access point. Then, the access point transmits the frame to the mobile terminal.

The broadcast/multicast transmission service is similar to the common transmission service, just except that fragmentation does not occur in the broadcast/multicast transmission service and that the frames are transmitted prior to other frames right after the transmission of the TIM in the broadcast/multicast transmission service.

Meanwhile, the PCF includes frame downlink transmission and frame uplink transmission. The frame uplink transmission is provided only when the mobile terminal can respond to a CF POLL frame.

Information on whether the mobile terminal can respond to a CF POLL frame or not is provided when the mobile terminal is associated with the access point. During the contention-free period, the access point performs round robin according to an association identifier (AID) and transmits an MAC protocol data unit (MPDU) to each mobile terminal.

Here, the AID is an identifier the access point gives to the mobile terminal to identify the mobile terminal accessing thereto. If the mobile terminal can respond to a CF POLL frame, the CF POLL frame is transmitted to the mobile terminal independently or piggybacked. Then, the mobile terminal that receives the CF POLL frame is qualified to perform uplink transmission of an MPDU. The above-mentioned process is repeated until the content-free duration is ended.

In order to support the DCF service which includes the common, PS-mode and broadcast/multicast transmission services and the PCF service, interface and a buffer management method for transmitting frames between the MAC processing apparatus and wireless physical layers are required.

However, the conventional static buffer management method operates buffers allocated to each port statically, as illustrated in FIG. 1. According to the conventional method, services are provided by allocating a buffer to each port, adding the allocated buffer to a buffer 11 sequentially, and rotating the buffer. This method has a shortcoming that many buffers are used wastefully in a wireless LAN system where a plurality of mobile terminals are used, because a port is allocated to a mobile terminal.

Referring to FIG. 2, a conventional dynamic buffer management method operates buffers allocated to ports dynamically. According to the conventional dynamic buffer management method, frames are transmitted by allocating buffers dynamically in the order that the frames arrive in a transmission frame buffer 22 and queuing the buffers to a transmission queue table 21 sequentially. Therefore, the wasteful use of buffers can be reduced. However, this method, too, has a shortcoming that it is hard to find a frame for a particular mobile terminal in a PCF service.

Since the above-mentioned prior arts store frames on an MSDU by MSDU basis, they cannot smoothly support the PCF service, where the mobile terminals transmit frames according to round-robin method on an MPDU by MPDU basis.

SUMMARY OF THE INVENTION

It is, therefore, an object of the present invention to provide a transmission controller of a media access control (MAC) processing apparatus that uses a shared transmission frame buffer and a multiple-queue, and a method of the transmission controller. The shared transmission frame buffer divides one MAC service data unit (MSDU) into a plurality of MAC protocol data units (MPDUS) and stores them. The multiple-queues are divided according to each service type.

In accordance with an aspect of the present invention, there is provided a transmission controller used in an MAC processing apparatus, including: a transmission frame sorting unit for sorting out transmission frames transmitted from a logical link control (LLC) layer based on each transmission service and requesting control of the transmission frames; a transmission queue controlling unit for requesting to store the transmission frames, information on the transmission frames, and controlling the transmission of the transmission frames by using first frame identifiers (FID) and the information on the transmission frames, upon the request for controlling the transmission frames from the transmission frame sorting means; a transmission queue storing unit for storing information on the sorting of the transmission frames based on each transmission service or each mobile terminal under the control of the transmission queue controlling means; a frame controlling unit for storing the transmission frames under the control of the transmission queue controlling means, generating and storing CF POLL frames when the mobile terminal associated with an access point can respond to a CF POLL frame, and transmitting the transmission frames and the CF POLL frames to a wireless physical layer; a shared transmission frame storing unit for storing the transmission frames in a form of a list where transmission frame structures are connected with each other, i.e., a transmission frame structure list, under the control of the frame controlling means, and transmitting the transmission frames to the wireless physical layer based on the transmission frame structure list, the transmission frame structures being formed on an MPDU basis; and a CF POLL frame storing unit for storing the CF POLL frames used in a point coordination function (PCF) service and transmitting the CF POLL frames to the wireless physical layer under the control of the frame controlling means.

In accordance with another aspect of the present invention, there is provided a method for controlling transmission of frames in a transmission controller of an MAC processing apparatus, comprising the steps of: a) a transmission frame sorter sorting out transmission frames transmitted from an LLC layer according to each transmission service type and requesting a transmission queue controller to control the transmission frames, connecting the transmission frames to a transmission frame list of a transmission frame buffer, and updating a transmission queue table; and b) transmitting the transmission frames to a wireless physical layer based on the transmission frame list stored in the transmission frame buffer according to each transmission service type or each mobile terminal upon a transmission request from outside, and updating a first FID of the transmission queue controller or the transmission queue table based on the transmission result.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
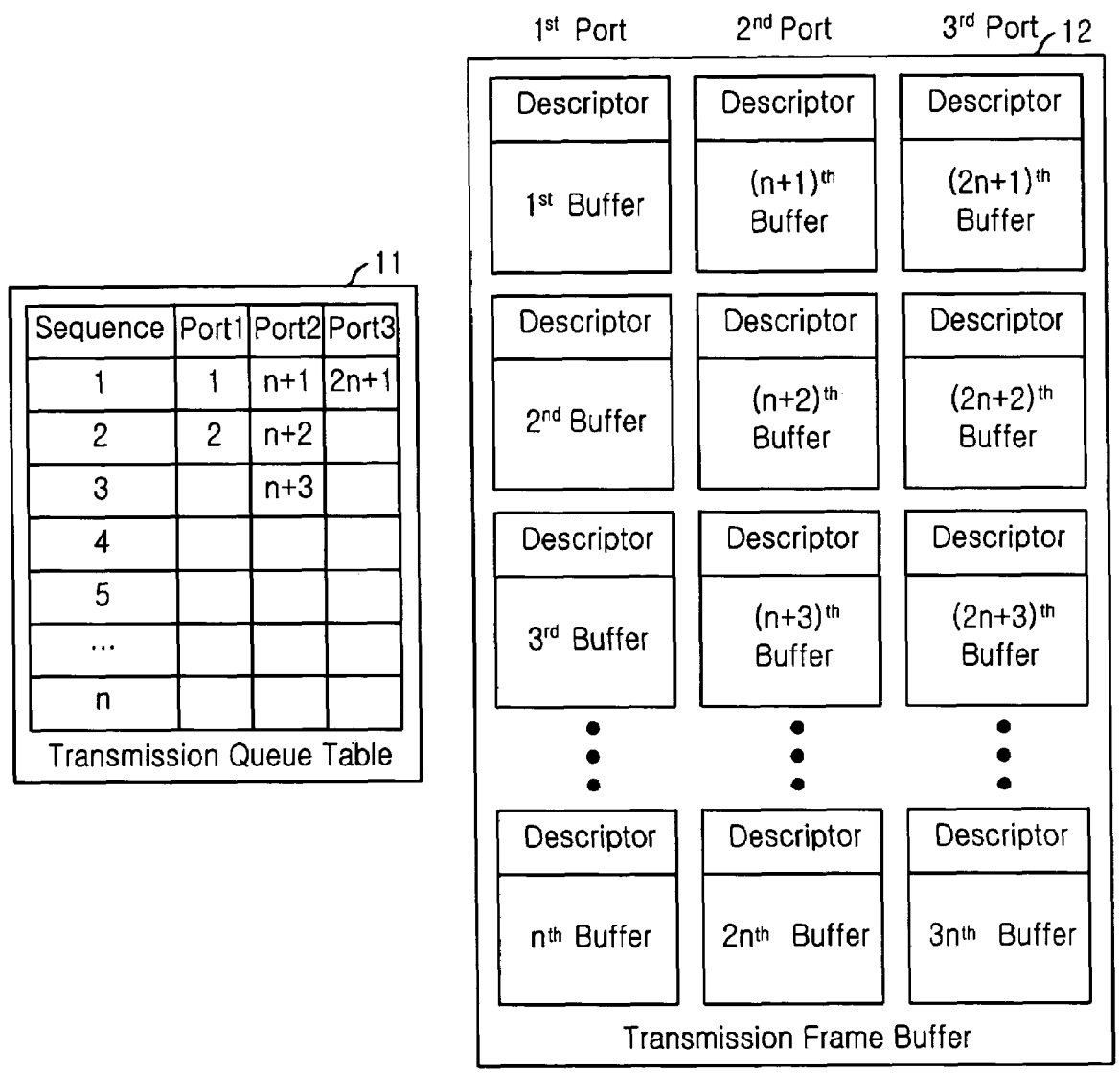
FIG. 1 is a diagram describing a static buffer management method used for a transmission controller of a media access control (MAC) processing apparatus according to prior art.
Figure 2:
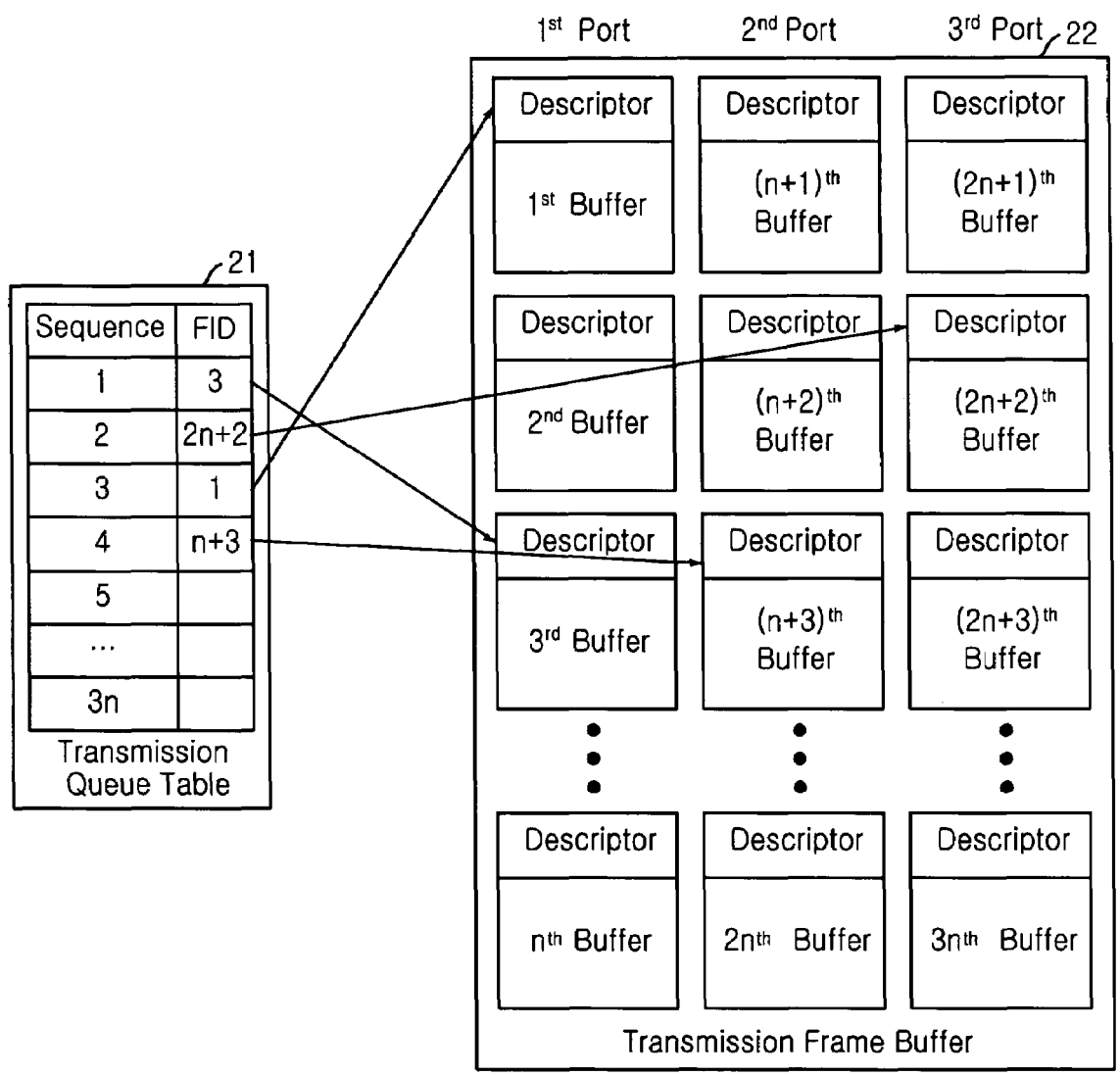
FIG. 2 is a diagram illustrating a dynamic buffer management method used for a transmission controller of an MAC processing apparatus according to prior art.
Figure 3:
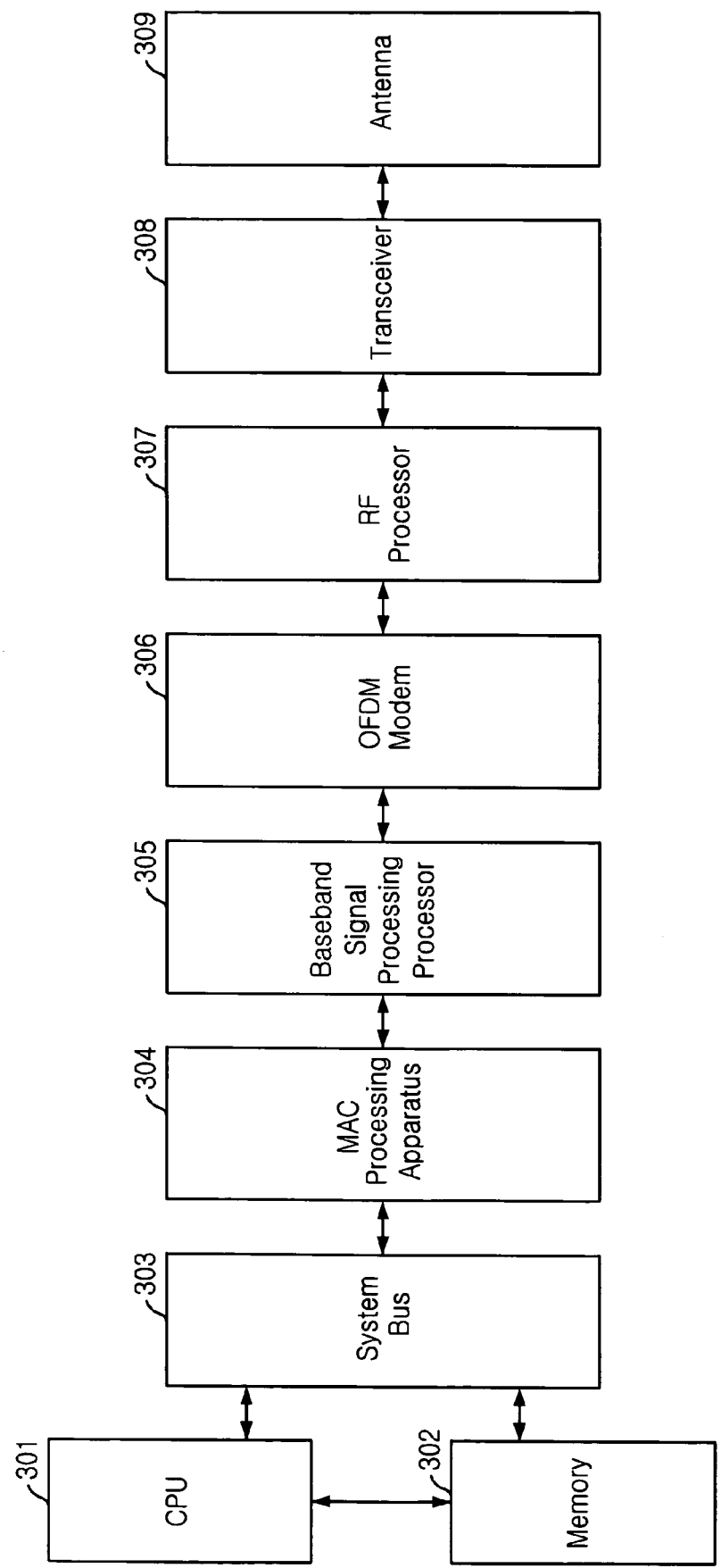
FIG. 3 is a diagram showing a structure of an access point in accordance with an embodiment of the present invention.

FIG. 3 is a diagram showing a structure of an access point in accordance with an embodiment of the present invention. Referring to FIG. 3, the access point includes a central processing apparatus 301, a memory 302, a system bus 303, a media access control (MAC) processing apparatus 304, a baseband signal processing processor 305, an orthogonal frequency division multiplexing (OFDM) modem 306, a radio frequency (RF) processor 307, a transceiver 315, and an antenna 309.

Followings are the structures and operations of the elements of the access point. An input goes into the MAC processing apparatus 304 through an interface of the system bus 303 and processed in the MAC processing apparatus 304 to output an MAC frame signal. The MAC frame signal is converted into a baseband signal in the baseband signal processing processor 305, and the baseband signal is converted into an OFDM signal in the OFDM modem 306. The OFDM signal is transmitted to the RF processor 307. Then, the RF processor 307 transmits the OFDM signal to the transceiver 308, which performs transmission of the OFDM signal through the antenna 309.

Figure 4:
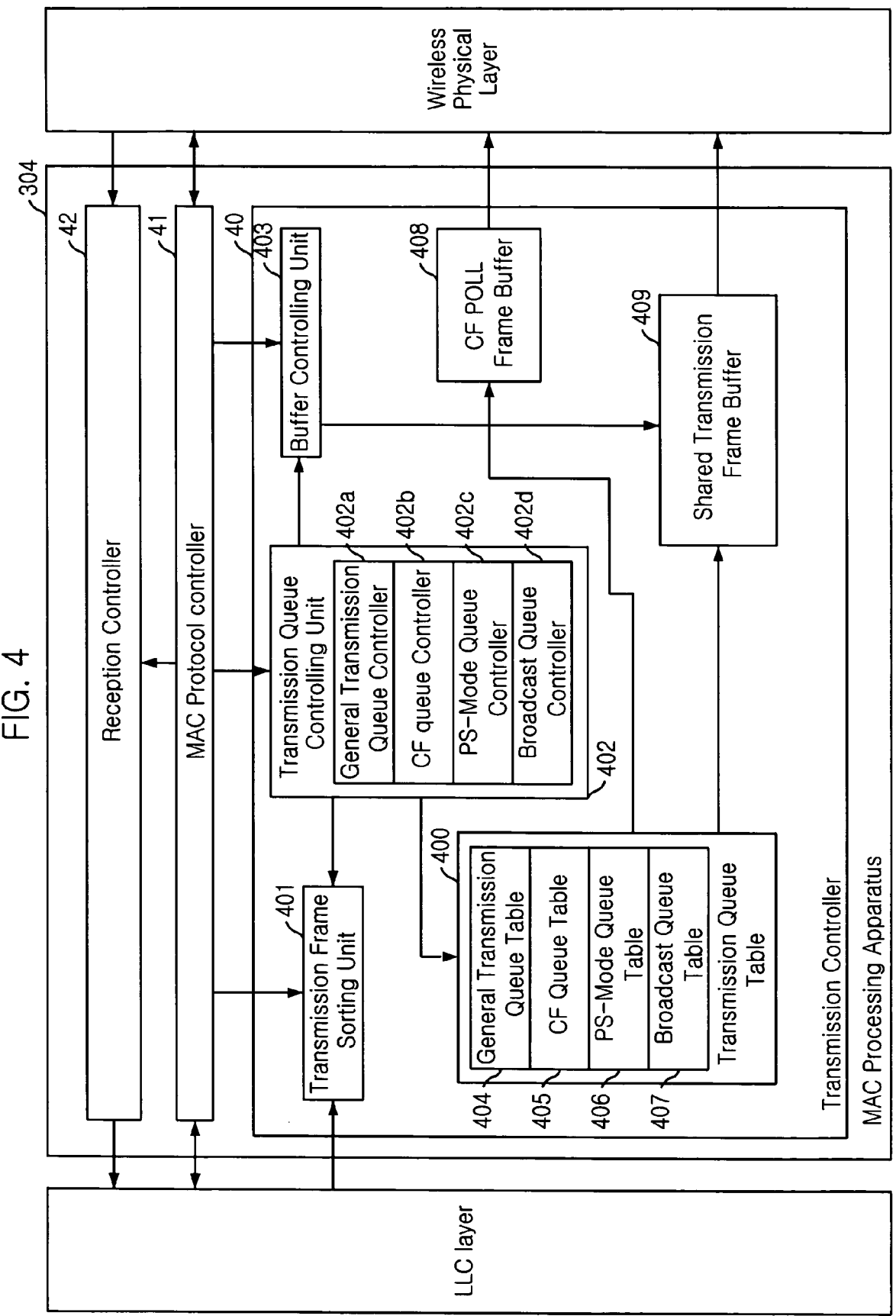
FIG. 4 is a block diagram depicting an MAC processing apparatus that includes a transmission controller in accordance with the embodiment of the present invention.

FIG. 4 is a block diagram depicting an MAC processing apparatus that includes a transmission controller in accordance with the embodiment of the present invention. Referring to FIG. 4, the transmission controller 40 of the MAC processing apparatus includes a transmission queue table 400, a transmission frame sorting unit 401, a transmission queue controlling unit 402, a buffer controlling unit 403, a CF POLL frame buffer 408, and a shared transmission frame buffer 409.

The transmission frame sorting unit 401 receives transmission frames from a logical link control (LLC) layer and sorts the transmission frames according to the type of transmission service required to the transmission frames, and requests a transmission queue controlling unit 402 to control the transmission frames.

The transmission queue controlling unit 402 is requested by the transmission frame sorting unit 401 to control the transmission frames, requests the buffer controlling unit 403 to store the transmission frames, and stores and manages a transmission queue table 400 and first frame identifiers (FID).

The transmission queue table 400 is controlled by the transmission queue controlling unit 402 and stores information on the transmission frames sorted according to each transmission service type or mobile terminal.

The buffer controlling unit 403 is controlled by the transmission queue controlling unit 402 to store the transmission frames in the shared transmission frame buffer 409. When a mobile terminal that is responsive to a CF POLL frame is associated with the access point, the buffer controlling unit 403 generates a CF POLL frame, stores the CF POLL frame in the CF POLL frame buffer 408, and transmits the transmission frames and the CF POLL frame to a wireless physical layer.

The shared transmission frame buffer 409 is also controlled by the buffer controlling unit 403 and stores the transmission frames in the form of a transmission frame structure list where the transmission frame structures, each of which is formed on an MPDU basis, are connected with each other, and transmits them to the wireless physical layer.

The CF POLL frame buffer 408 is controlled by the buffer controlling unit 403 and stores the CF POLL frames, which are used for a PCF service, and transmits the CF POLL frames to the wireless physical layer.

The transmission queue table 400 includes a general transmission queue table 404, a CF queue table 405, a power-saving (PS)-mode transmission queue table 406, and a broadcast queue table 407.

The general transmission queue table 404 stores information on the transmission frames requesting general transmission service of a distributed coordination function (DCF). The PS-mode transmission queue table 406 stores information on the transmission frames requesting a DCF PS-mode transmission service.

The broadcast queue table 407 stores information on the transmission frames requesting a DCF broadcast/multicast service and information on whether each mobile terminal can respond to a CF POLL frame.

The transmission queue controlling unit 402 includes a general transmission queue controller 402a, a CF queue controller 402b, a PS-mode queue controller 402c, and a broadcast queue controller 402d to control the queue tables 404 to 407, individually.

The transmission frame sorting unit 403 receives frames to be transmitted from the LLC layer and assigns the control of the transmission frames to the corresponding controllers of the transmission queue controlling unit 402 according the requested services. That is, the transmission frame sorting unit 403 assigns the control of the transmission frames to the general transmission queue controller 402a, the CF queue controller 402b, the PS-mode transmission queue controller 402c, and the broadcast queue controller 402d according to each transmission service type requested by the transmission frames, individually.

The shared transmission frame buffer 409 includes an array of transmission frame structures 500 having the same size, each identified by an Index field value. It divides a transmission frame into a plurality of transmission frame structures formed on a basis of an MAC service data unit (MSDU) and stores the transmission frame structures. When the transmission frame structures need to be transmitted, the shared transmission frame buffer 409 transmits the MPDUs directly to the wireless physical layer under the control of the buffer controlling unit 403. An architecture of a transmission frame structure 500 is shown in FIG. 5.

Figure 5:
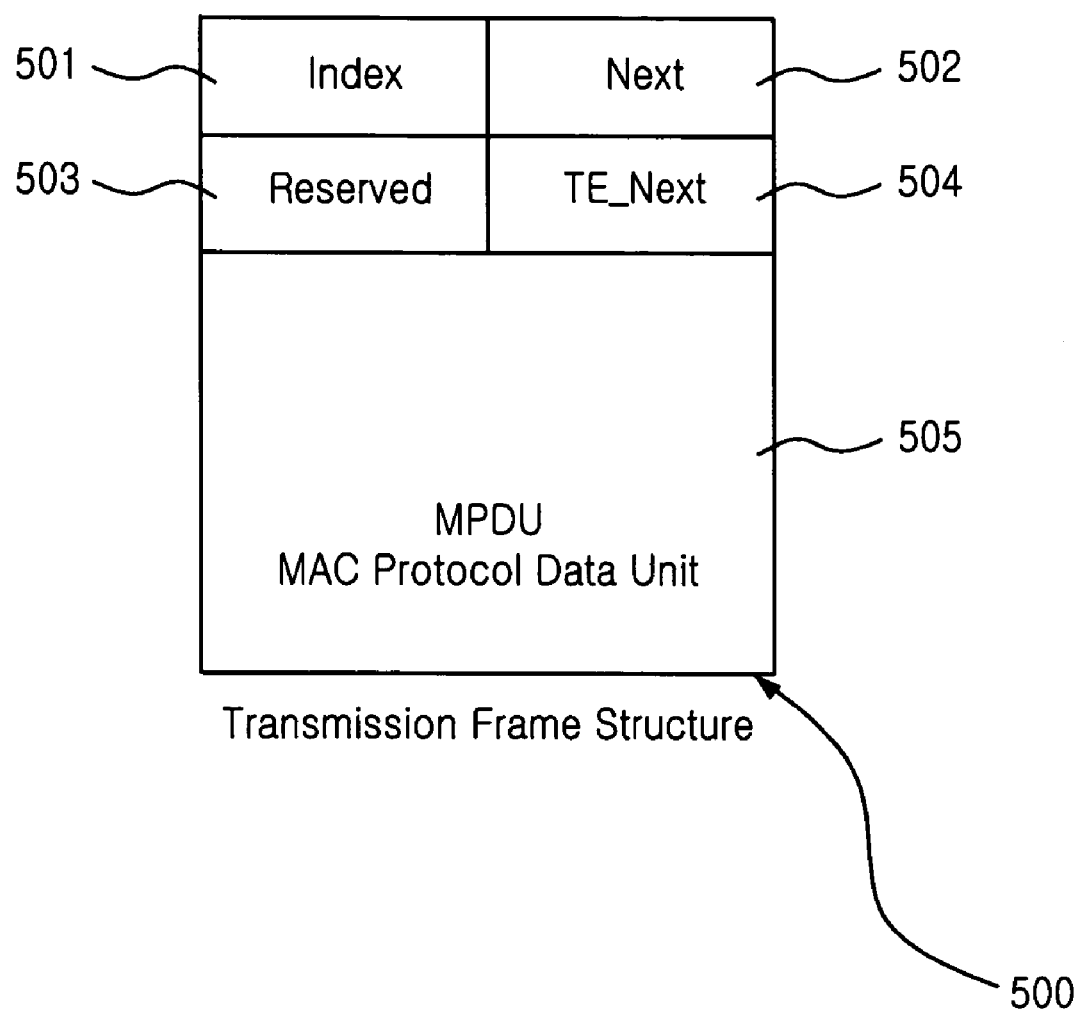
FIG. 5 is a diagram showing an architecture of a transmission frame in accordance with the embodiment of the present invention.

Referring to FIG. 5, the transmission frame structure 500 includes an Index field 501, a Next field 502, a Reserved field 503, a TE_Next field 502, and an MPDU field 505. The Index field 501 of the transmission frame structure has an FID so that the transmission frame structure could be identified in the shared transmission frame buffer 409. When an error occurs, the FID informs where the error has occurred.

The Next field 502 has an FID that is an Index field value of a transmission frame structure to be transmitted next. The FID is used to generate a transmission frame structure list where transmission frame structures are connected according to each transmission service type. That is, the transmission frame structures are connected to form one single list by making the Next field 502 indicate the Index field of a transmission frame structure to be transmitted next.

The TE_Next field 504 contains an FID of a transmission frame structure to be retransmitted when the current transmission frame structure falls into disuse due to transmission error. The value of the TE_Next field 504 becomes an FID of a first transmission frame structure of an MSDU that should be transmitted next to the MSDU to which the transmission frame structure having the error belongs. That is, when a transmission error occurs, the MSDU having the transmission frame structure of the error occurrence needs not be transmitted entirely. Therefore, the value of the TE_Next field 504 is needed to go for the next MSDU to be transmitted.

Meanwhile, the DCF service has one connection list for each service, while the PCF service has one connection list for each mobile terminal.

The CF POLL frame buffer 408 includes an array of CF POLL frames. The CF POLL frames are identified by their indexes in the CF POLL frame buffer 408. The indexes are referred to as POLL frame identifiers (PFID). Since the CF POLL frame buffer 408 needs one CF POLL frame for each mobile terminal, it does not use any connection list.

Meanwhile, the transmission frame sorting unit 401, the transmission queue controlling unit 402, and the buffer controlling unit 403 of the transmission controller 40 are operated upon the control of an MAC protocol 41 in the MAC processing apparatus 304.

Figure 6:
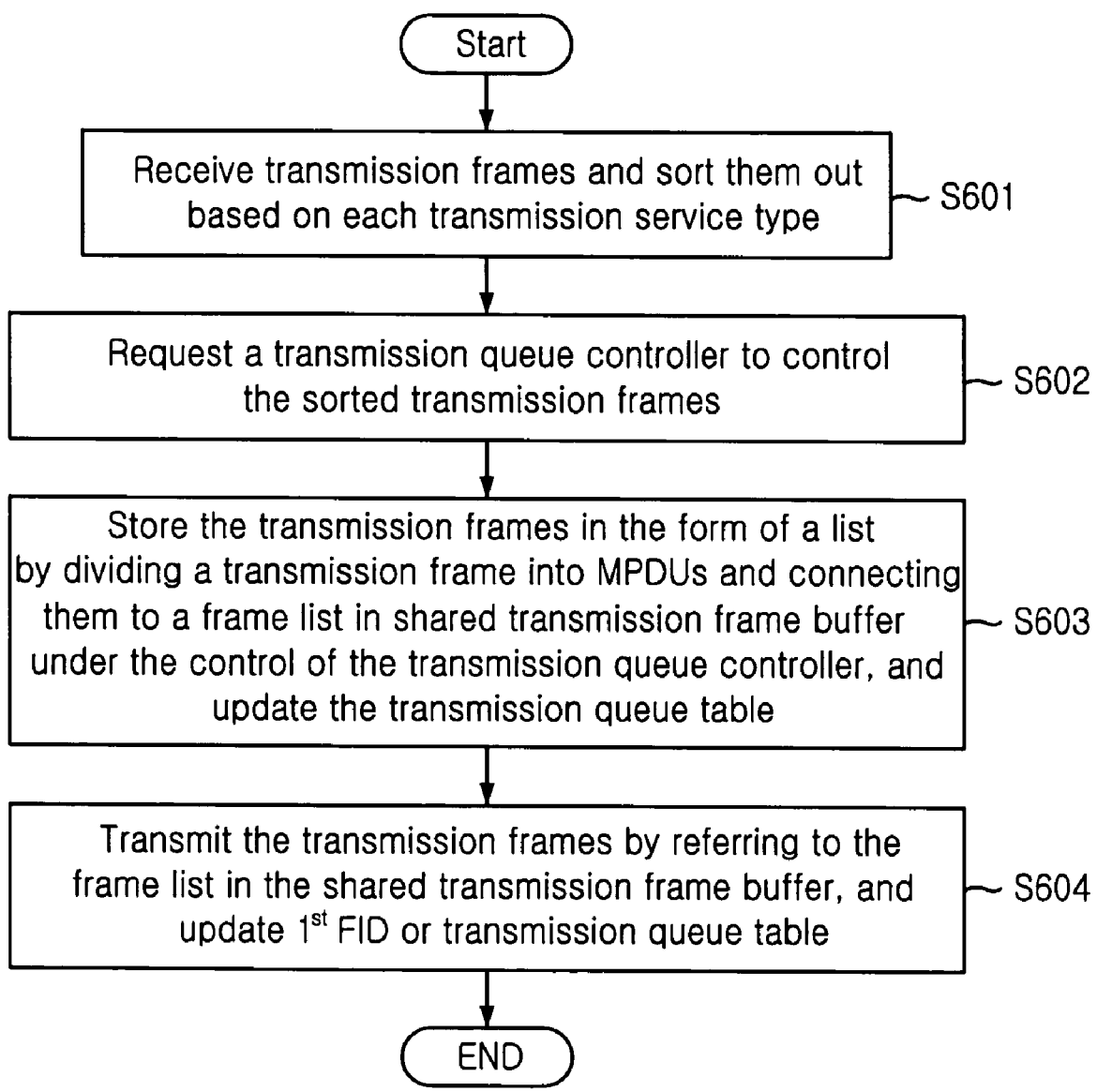
FIG. 6 is a flowchart illustrating a transmission controlling method of the transmission controller used in the MAC processing apparatus in accordance with the embodiment of the present invention.

FIG. 6 is a flowchart illustrating a transmission controlling method of the transmission controller used in the MAC processing apparatus in accordance with the embodiment of the present invention. First, at step S601, the transmission frame sorting unit 401 receives transmission frames from the LLC layer and sorts out the transmission frames according to each transmission service type.

At step S602, the transmission queue controlling unit 402 is requested to control the transmission frame sorted according to the transmission service type. Then, at step S603, the buffer controlling unit 403 divides the transmission frame into MPDUs under the control of the transmission queue controlling unit 402, stores them in the shared transmission frame buffer 409 in the form of a transmission frame structure list where transmission frame structures are connected with each other, and the transmission queue controlling unit 402 updates a transmission queue table 400.

Here, the transmission queue table 400 is referred to and it is checked whether there is a list already existing in the shared transmission frame buffer 409. If yes, the newly stored list is connected to the existing list. This process is performed differently according to the type of coordination function, that is, DCF or PCF. Further details will be described herein with reference to FIGS. 7 and 9.

Subsequently, at step S604, the transmission frame is transmitted with reference to the frame connection list which is stored in the shared transmission frame buffer 409 upon the service request, and then the first FID of the corresponding transmission queue controlling unit 402 or the corresponding transmission queue table 400 is updated according to the transmission result.

Figure 7:
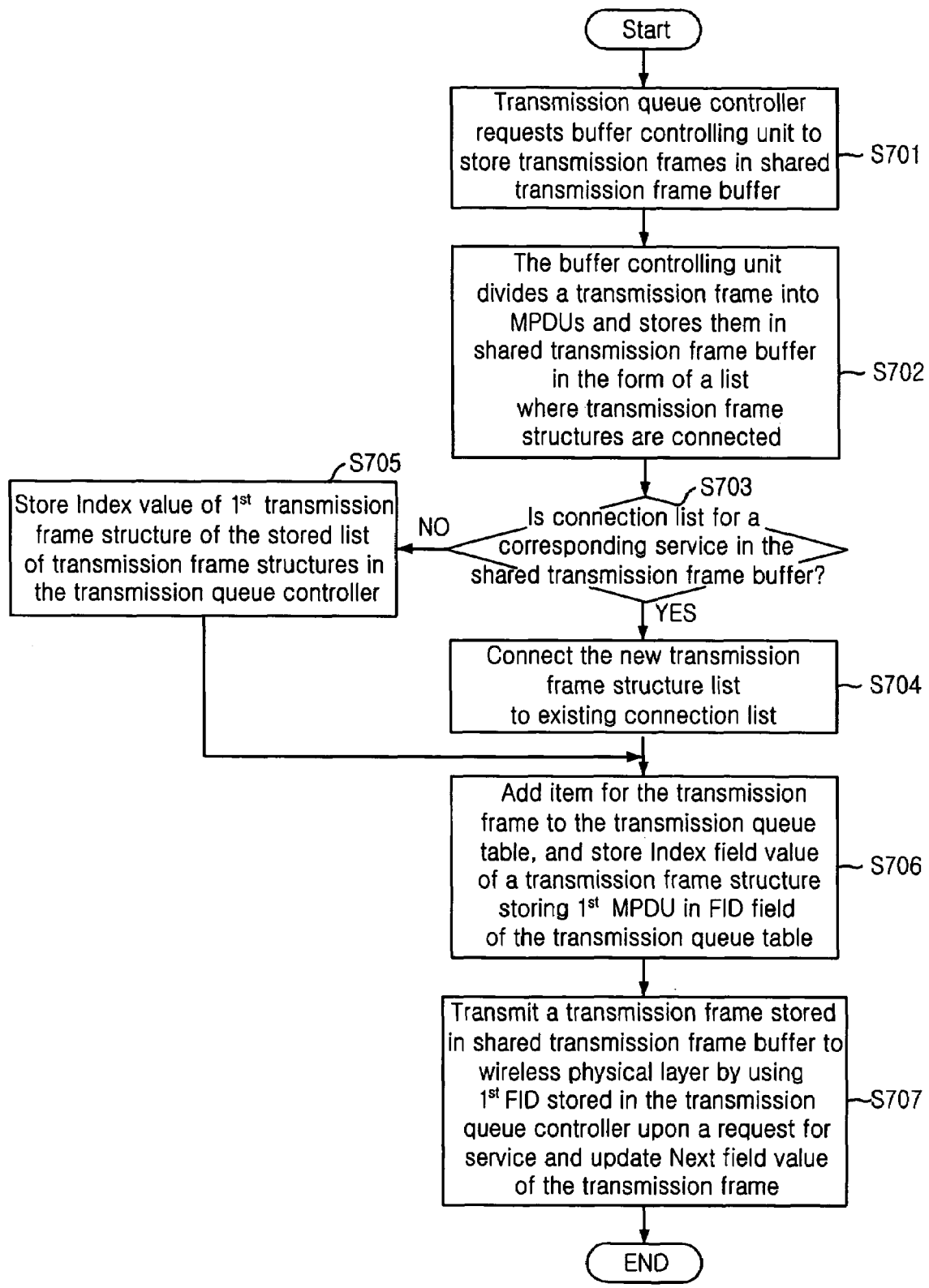
FIG. 7 is a flowchart describing a transmission process based on a distributed coordination function (DCF) in the transmission controller of the MAC processing apparatus in accordance with the embodiment of the present invention.
Figure 8:
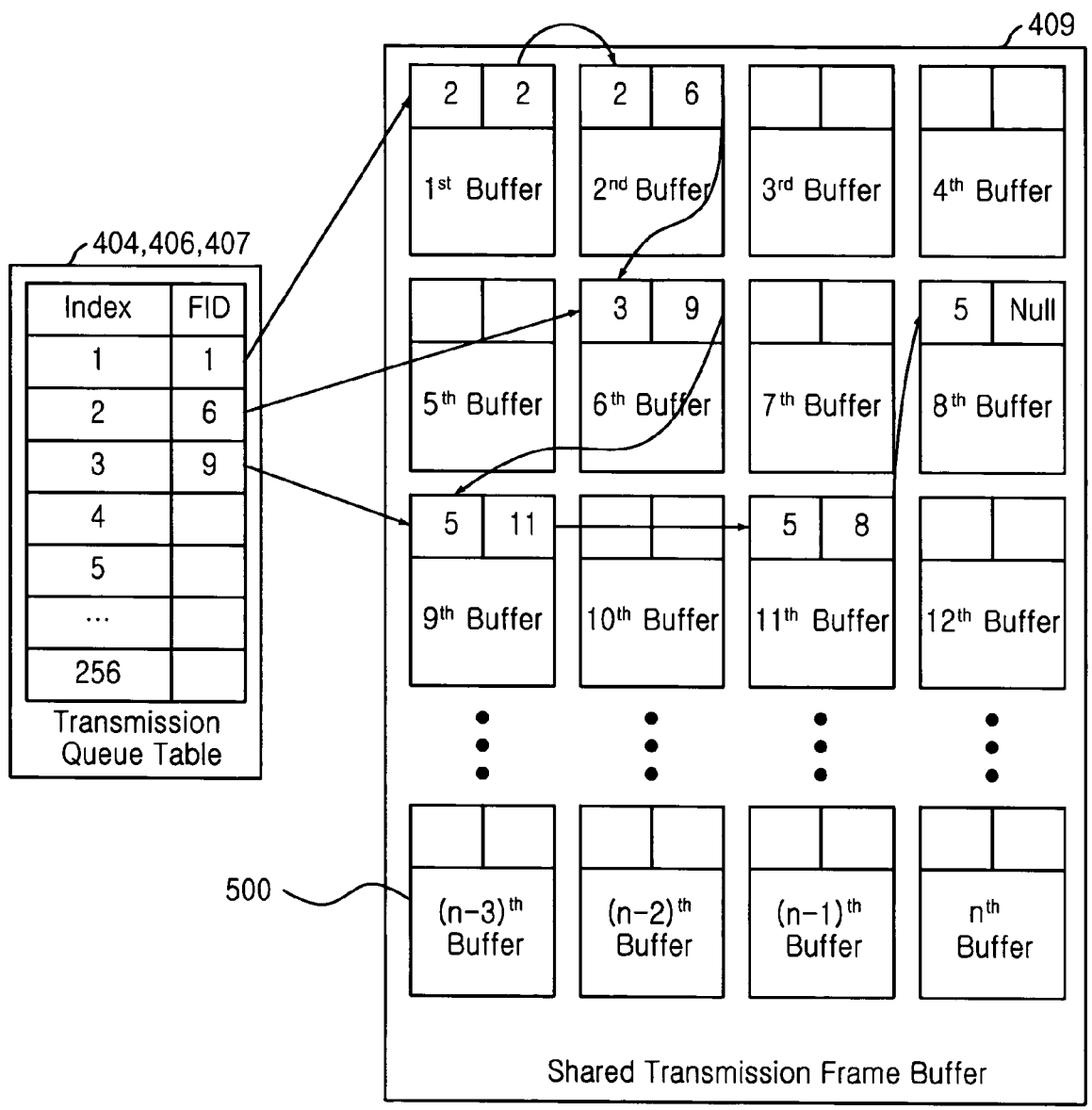
FIG. 8 is a diagram showing a dynamic buffer management method used for the DCF transmission of the transmission controller in the MAC processing apparatus in accordance with the embodiment of the present invention.

FIG. 7 is a flowchart describing a transmission process based on a DCF in the transmission controller of the MAC processing apparatus in accordance with the embodiment of the present invention. FIG. 8 is a diagram showing a dynamic buffer management method used for the DCF transmission of the transmission controller in the MAC processing apparatus in accordance with the embodiment of the present invention.

First, at step S701, the transmission queue controlling unit 402, which is requested to control the transmission frames sorted by the transmission frame sorting unit 401 according to each transmission service type, requests the buffer controlling unit 403 to store the transmission frames in the shared transmission frame buffer 409. The buffer controlling unit 403 stores the transmission frames in the shared transmission frame buffer 409 in the form of a plurality of transmission frame structures which are obtained by dividing the transmission frame on an MPDU basis.

At step S702, the next field of a transmission frame structure, which is shown in FIG. 8, indicates an Index field that stores the FID of a transmission frame structure to be transmitted next to thereby form one connection list. Also, at step S703, it is checked whether there is a list for a corresponding service in the shared transmission frame buffer 409. If there is a list, at step S704, the newly stored transmission frame structure list is connected to the end of the existing list to make only one list exist for one service. If there is no list, at step S705, the Index field value of a first transmission frame structure of the new list of transmission frame structures in the transmission queue controller 402.

When the formation of the list is completed, as shown in FIG. 8, information on a newly added MSDU is added to an empty entry most close to a transmission queue table 400. In other words, at step S706, an Index field value (i.e., a frame identifier) of a transmission frame structure storing a first MPDU of an added MSDU is stored in an FID field of the transmission queue table 400.

Subsequently, whenever an arbitrary service is requested, it is possible to transmit data without referring to the transmission queue table 400. This is because the first FID exists in the transmission queue controlling unit 402 and the first FID stores an Index field value of the first transmission frame structure in the transmission frame structure list, which is stored in the shared transmission frame buffer 409.

Therefore, whenever a service is requested, at step S707, a transmission frame stored in the position of the stored first FID is transmitted to the wireless physical layer, and the Next field value of the transmission frame structure is stored in the first FID of the transmission queue controlling unit to thereby indicate a transmission frame structure to be transmitted next.

Figure 9:
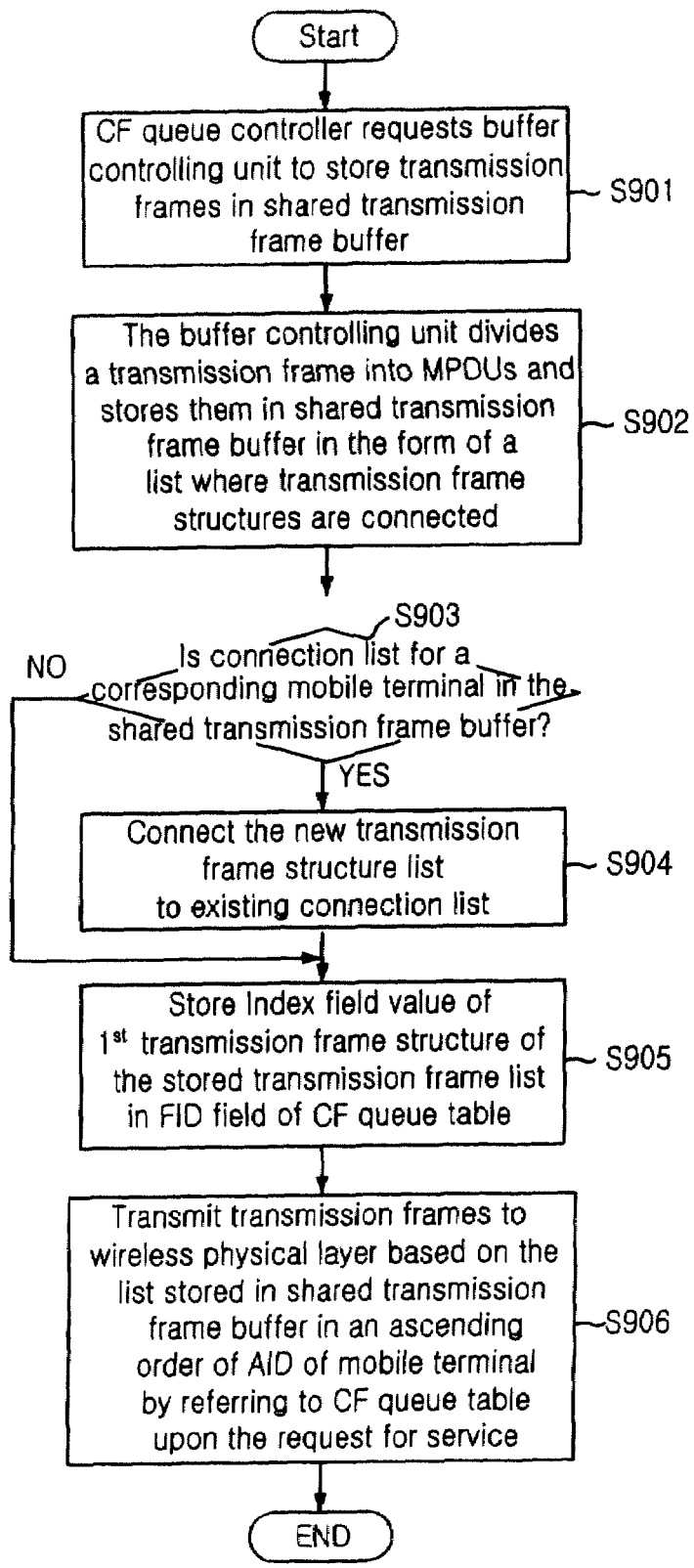
FIG. 9 is a flowchart depicting a transmission process using a point coordination function (PCF) in the transmission controller of the MAC processing apparatus in accordance with the embodiment of the present invention.
Figure 10:
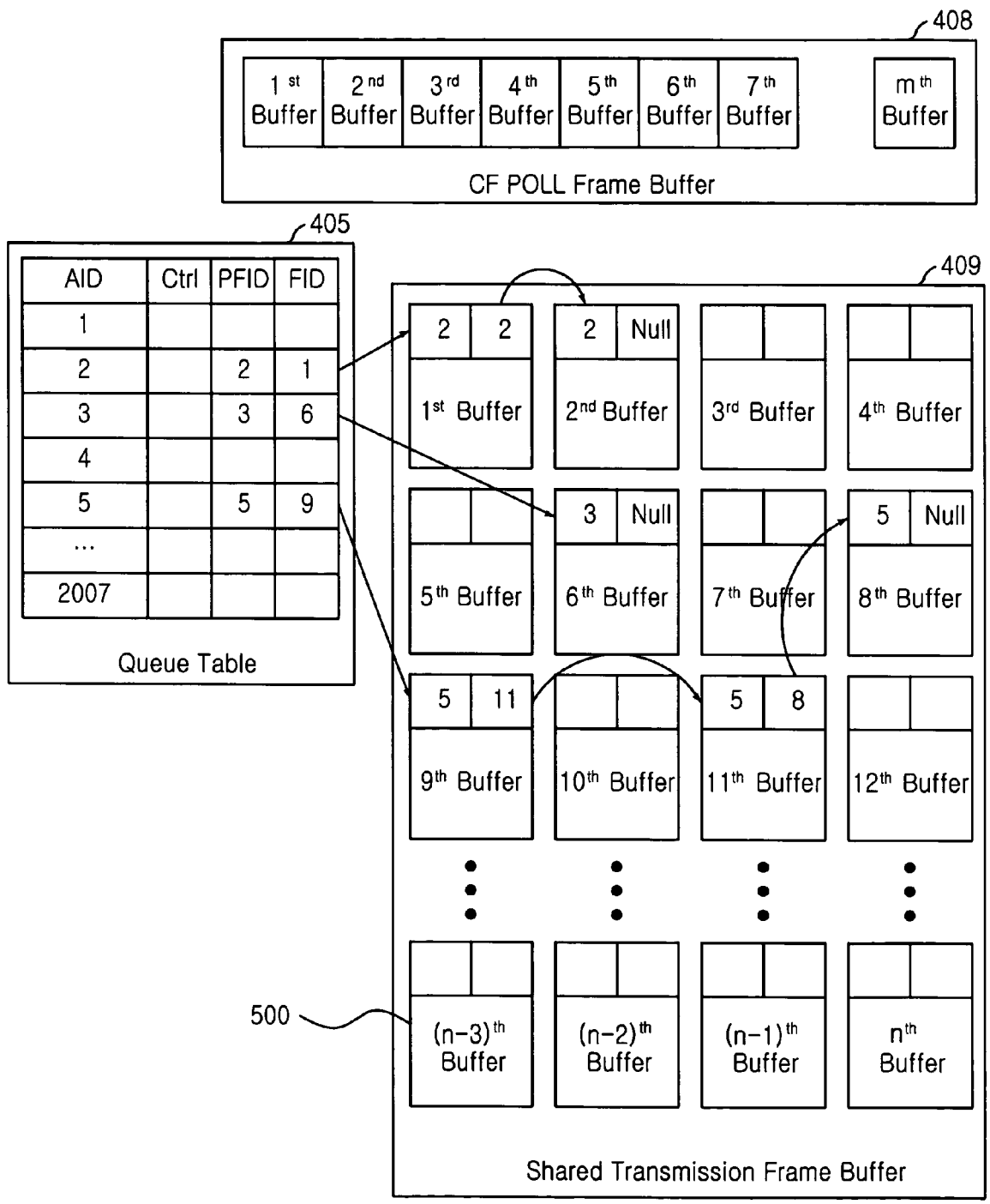
FIG. 10 is a diagram illustrating a dynamic buffer management method which is used for PCF transmission in the MAC processing apparatus in accordance with the embodiment of the present invention.

FIG. 9 is a flowchart depicting a transmission process based on PCF in the transmission controller of the MAC processing apparatus in accordance with the embodiment of the present invention. FIG. 10 is a diagram illustrating a dynamic buffer management method which is used for PCF transmission in the MAC processing apparatus in accordance with the embodiment of the present invention.

Largely, the PCF service includes steps of generating CF POLL frames in the transmission queue table 400 when the mobile terminal is associated with an access point, storing the transmission frames from the LLC layer in the shared transmission frame buffer 409, and transmitting the transmission frames to the wireless physical layer.

To describe the CF queue table 405 first, the access point includes an AID field for discriminating which mobile terminal is connected to itself, a response (Ctrl) field for indicating POLL responsiveness of the mobile terminal, a POLL frame identifier (PFID) for indicating a storage location of a CF POLL frame in the CF POLL frame buffer 408, and an FID field for storing a index of a first transmission frame of a transmission frame list for the mobile terminal stored in the shared transmission frame buffer 409.

First, when a CF POLL-responsive mobile terminal is associated with the access point, a CF queue controller 402b requests the buffer controlling unit 403 to store a CF POLL frame. Then, the buffer controlling unit 403 generates a CF POLL frame for the mobile terminal, stores it in the CF POLL frame buffer 408, and transmits a PFID that indicates the storage location of the CF POLL frame to the CF queue controller 402b.

The CF queue controller 402b finds out an entry for the mobile terminal in the CF queue table 405, marking in the response (Ctrl) field that the mobile terminal can respond to a CF POLL frame, and store the PFID in the PFID field. This way, it can be known that the mobile terminal can respond to a CF POLL and where the CF POLL frame is located in the CF.POLL buffer.

Subsequently, the CF POLL frame is stored in the CF queue table 405. At step S901, the CF queue controller 402b, which is requested by the transmission frame sorting unit 401 to control the transmission frames sorted according to each transmission service type, requests the buffer controlling unit 403 to store the transmission frames in the shared transmission frame buffer 409. Then, the buffer controlling unit 403 stores the transmission frames in the shared transmission frame buffer 409 in the form of a plurality of transmission frame structures which are formed on an MPDU basis.

At step S902, a connection list is formed by making a Next field of a transmission frame structure indicate an Index field that stores an FID of the next transmission frame structure, which is illustrated in FIG. 10. At step S903, it is checked whether the shared transmission frame buffer has a list for the mobile terminal.

If it has a list for the mobile terminal, at step S904, the newly stored transmission frame structure list is connected with the existing connection list so that only one connection list could exist for one mobile terminal. If it does not have a list for the mobile terminal, the logic flow goes to S905 directly.

When the formation of the connection list is completed, at step S905, an Index field value (i.e., an FID) of a first transmission frame structure of the transmission frame list is stored in the FID field of the CF queue table 405.

At step S906, transmission frames are transmitted to the wireless physical layer based on the connection list stored in shared transmission frame buffer 409 in an ascending order of the AIDs of the mobile terminal by referring to the CF queue table 405 upon the request for PCF service. This process will be described more in detail, hereafter.

First, the transmission queue controlling unit 402 examines an entry for an AID of the mobile terminal in the CF queue table 405. If the FID of the entry is '0' and the response (Ctrl) value indicates that the mobile terminal can respond to a CF POLL frame, it transmits the PFID value to the buffer controlling unit 403. Then, the buffer controlling unit 403 transmits a transmission frame which is in the PFID location in the CF POLL buffer 408 to the wireless physical layer.

If the FID of the entry is not '0', the buffer controlling unit 403 transmits to the wireless physical layer an MPDU field value of a transmission frame structure indicating the FID value in the shared transmission frame buffer 409. Here, a CF POLL frame is piggybacked to an MPDU corresponding to the CF POLL frame. After the piggyback of the CF POLL frame to an MPDU, a Next field value of a transmission frame structure storing the MPDU is stored in the FID of the CF queue table 405.

As described above, the technology of the present invention can reduce the wasteful use of buffers by allocating the shared transmission frame buffer dynamically, and search a frame to be transmitted quickly by providing one connection list for each service or each mobile terminal and queue tables therefor. Also, differently from a conventional method that stores frames on an MSDU basis, the technology of the present invention can support a PCF service, in which frames are transmitted based on an MPDU, efficiently by storing frames on an MPDU basis.

While the present invention has been described with respect to certain preferred embodiments, it will be apparent to those skilled in the art that various changes and modifications may be made without departing from the scope of the invention as defined in the following claims.

What is claimed is:

1. A transmission controller used in a media access control (MAC) processing apparatus, comprising:
   a transmission frame sorting means for sorting out transmission frames transmitted from a logical link control (LLC) layer based on each transmission service and requesting control of the transmission frames;
   a transmission queue controlling means for requesting to store the transmission frames, information on the transmission frames, and controlling the transmission of the transmission frames by using first frame identifiers (FID) and the information on the transmission frames, upon the request for controlling the transmission frames from the transmission frame sorting means;
   a transmission queue storing means for storing information on the sorting of the transmission frames based on each transmission service or each mobile terminal under the control of the transmission queue controlling means;
   a frame controlling means for storing the transmission frames under the control of the transmission queue controlling means, generating and storing CF POLL frames when the mobile terminal associated with an access point can respond to a CF POLL frame, and transmitting the transmission frames and the CF POLL frames to a wireless physical layer;
   a shared transmission frame storing means for storing the transmission frames in a form of a transmission frame structure list where transmission frame structures are connected with each other under the control of the frame controlling means, and transmitting the transmission frames to the wireless physical layer based on the list, the transmission frame structures being formed on an MAC protocol data unit (MPDU) basis; and
   a CF POLL frame storing means for storing the CF POLL frames used in a point coordination function (PCF) service and transmitting the CF POLL frames to the wireless physical layer under the control of the frame controlling means.

2. The transmission controller as recited in claim 1, wherein the transmission queue storing means includes:
   a first transmission queue storage for storing information on a transmission frame requesting a general transmission service of a distributed coordination function (DCF);
   a second transmission queue storage for storing information on a transmission frame requesting a DCF power-saving mode transmission service;
   a third transmission queue storage for storing information on a transmission frame requesting a DCF broadcast/multicast service; and
   a fourth transmission queue storage for storing information on a transmission frame requesting the PCF service and information on whether a mobile terminal can respond to a CF POLL frame.

3. The transmission controller as recited in claim 2, wherein each of the first to third transmission queue storages includes an Index field and a frame identifier (FID) field and, in the FID field, an index field value of a transmission frame structure storing a first MPDU of a MAC service data unit (MSDU) newly added to the shared transmission frame storing means is stored.

4. The transmission controller as recited in claim 2, wherein the fourth transmission queue storage includes:
   an association identifier (AID) field for discriminating a mobile terminal connected to an access point;
   a response field for indicating whether the mobile terminal can respond to a CF POLL frame;
   a POLL frame identifier (PFID) for indicating a storage location in the CF POLL frame storing means; and
   a FID field for storing an index value of a first frame of a transmission frame list for the mobile terminal, which is stored in the shared transmission frame storing means.

5. The transmission controller as recited in claim 2, wherein the transmission queue controlling means includes:
   a first transmission queue controller for dividing a transmission frame into MPDUs, storing the MPDUs in the transmission frame storage, and updating the data of the first transmission queue storing means, when the transmission frame sorting means assigns control of a DCF general transmission service to the transmission frame;
   a second transmission queue controller for dividing a transmission frame into MPDUs, storing the MPDUs in the transmission frame storage, and updating the data of the second transmission queue storing means, when the transmission frame sorting means assigns control of a DCF power-saving (PS) mode transmission service to the transmission frame;
   a third transmission queue controller for dividing a transmission frame into MPDUs, storing the MPDUs in the transmission frame storage, and updating the data of the third transmission queue storing means, when the transmission frame sorting means assigns control of a DCF broadcast/multicast service to the transmission frame; and
   a fourth transmission queue controller for dividing a transmission frame into MPDUs, storing the MPDUs in the transmission frame storage, and updating the data of the fourth transmission queue storing means, when the transmission frame sorting means assigns control of a PCF service to the transmission frame.

6. The transmission controller as recited in claim 1, wherein the transmission frame storing means includes an array of transmission frame structures, each identified by a FID and having the same size, and a transmission frame structure includes a FID, an Index field for storing the FID, a Next field for storing a FID of a transmission frame structure to be transmitted next to the current transmission frame structure, a TE_Next field for storing a FID of a transmission frame structure to be transmitted after the next transmission frame structure to be transmitted next to the current transmission frame structure, and a reserved field.

7. The transmission controller as recited in claim 1, wherein the CF POLL frame storing means is formed of an array of CF POLL frames, each identified by a POLL frame identifier (PFID), and one CF POLL frame is assigned to one mobile terminal associated with an access terminal.

8. The transmission controller as recited in claim 1, wherein the transmission queue controlling means includes a first FID stored in the transmission queue storing means, and the first FID includes an Index field value of a first transmission frame structure in a transmission frame structure list stored in the transmission queue storing means, and the first FID is updated according to addition or transmission of a transmission frame.

9. A method for controlling transmission of frames in a transmission controller of a media access control (MAC) processing apparatus, comprising the steps of:
 a) a transmission frame sorter sorting out transmission frames transmitted from a logical link control (LLC) layer according to each transmission service type and requesting a transmission queue controller to control the transmission frames, connecting the transmission frames to a transmission frame list of a transmission frame buffer, and updating a transmission queue table;
 b) transmitting the transmission frames to a wireless physical layer based on the transmission frame list stored in the transmission frame buffer according to each transmission service type or each mobile terminal upon a transmission request from outside, and updating a first frame identifier (FID) of the transmission queue controller or the transmission queue table based on the transmission result; and
 c) generating a CF POLL frame and storing the CF POLL frame in the CF POLL frame buffer, when the mobile terminal associated with an access point can respond to a CF POLL frame.

10. The method as recited in claim 9, wherein the step c) includes the steps of:
 c1) requesting a buffer controller to generate a CF POLL frame for the mobile terminal and store the CF POLL frame in the CF POLL frame buffer and transmitting a POLL frame identifier (PFID) for indicating a storage location of the CF POLL frame to a CF queue controller, when the mobile terminal associated with the access point can respond to a CF POLL frame; and
 c2) the CF queue controller receiving the PFID, finding an entry for the mobile terminal in a CF queue table, displaying in a response (Ctrl) field that the mobile terminal can respond to a CF POLL frame, and storing the PFID in a PFID field.

11. The method as recited in claim 9, wherein the step a) includes the steps of:
 a1) the transmission sorter receiving the transmission frame from the LLC layer and determining a kind of service needed for transmitting the transmission frame;
 a2) if the transmission frame is determined to be transmitted to the mobile terminal on a distributed coordination function (DCF) service and the mobile terminal is not in a power-saving (PS) mode, requesting a general transmission queue controller to control the transmission frame, connecting the transmission frame to a transmission frame list corresponding to the DCF general transmission service in the transmission frame buffer, and updating a general transmission queue table;
 a3) if the transmission frame is determined to be transmitted to the mobile terminal on a DCF service and the mobile terminal is in a PS mode, requesting a PS-mode transmission queue controller to control the transmission frame, connecting the transmission frame to a transmission frame list corresponding to the DCF PS-mode transmission service in the transmission frame buffer, and updating a PS-mode transmission queue table;
 a4) if the transmission frame is determined to be transmitted to the mobile terminal on a DCF broadcast/multicast service, requesting a broadcast queue controller to control the transmission frame, connecting the transmission frame to a transmission frame list corresponding to the broadcast/multicast service in the transmission frame buffer, and updating a broadcast queue table; and
 a5) if the transmission frame is determined to be transmitted to the mobile terminal on the PCF service, requesting a CF queue controller to control the transmission frame, connecting the transmission frame to a transmission frame list corresponding to the PCF transmission service in the transmission frame buffer, and updating a CF queue table.

12. The method as recited in claim 11, wherein each of the steps a2) to a4) includes the steps of:
 a6) the transmission queue controller requesting the buffer controller to store the transmission frame in the transmission frame buffer upon the request from the transmission frame sorter to control the transmission frame;
 a7) the buffer controller storing the transmission frame in the transmission frame buffer by dividing the transmission frame into a plurality of transmission frame structures which is formed on an MPDU basis;
 a8) the buffer controller determining if there is a connection list connected to the transmission frame buffer by referring to the corresponding transmission queue table;
 a9) if there is an existing connection list, connecting the transmission frame structures of the transmission frame with the existing connection list of transmission frame structures by storing a value of an Index field of the transmission frame structure list stored in the step a7) in a Next field of the existing connection list;
 a10) if no connection list exists, storing a value of an Index field of a first transmission frame structure of the transmission frame structure list stored in the step a7) in the transmission queue controller; and
 a11) adding an item for an MAC service data unit (MSDU) in an empty entry most close to the transmission queue table, and storing a value of an Index field of a transmission frame structure including a first MAC protocol data unit (MPDU) of the MSDU in a FID field of the transmission queue table.

13. The method as recited in claim 11, wherein the step a5) includes the steps of:
 a12) the CF queue controller requesting the buffer controller to store the transmission frame in the transmission frame buffer upon a request from the transmission frame sorter to control the transmission frame;
 a13) the buffer controller storing the MSDU in the transmission frame buffer in a form of a list where a plurality of transmission frame structures formed on an MPDU basis are connected with each other;
 a14) determining if there is an existing connection list for the mobile terminal in the transmission frame buffer by referring to the CF queue table;
 a15) if there is a connection list, connecting the transmission frame structures of the transmission frame to the existing connection list by storing a value of an Index field of the transmission frame structure list stored in the step a12) in a Next field of the existing connection list; and a16) if there is no connection list, storing a value of an Index field of a first transmission frame structure in the transmission frame structure list for the mobile terminal in a FID field of the CF queue table.

14. The method as recited in claim 9, wherein the step b) includes the steps of:

b1) if the transmission frame is determined to be transmitted to the mobile terminal on a DCF service and the mobile terminal is not in a PS mode, transmitting the transmission frame stored in the transmission frame buffer to a wireless physical layer by using a first frame identifier (FID) stored in the general transmission queue controller and storing a value of a Next field of the transmission frame in a first FID of the general transmission queue controller;

b2) if the transmission frame is determined to be transmitted to the mobile terminal on a DCF service and the mobile terminal is in the PS mode, transmitting the transmission frame stored in the transmission frame buffer to the wireless physical layer by using a first FID stored in the PS-mode transmission queue controller and storing a value of the Next field of the transmission frame in the first FID of the PS-mode transmission queue controller;

b3) if the transmission frame is determined to be transmitted to the mobile terminal on a DCF broadcast/multicast service, transmitting the transmission frame stored in the transmission frame buffer to the wireless physical layer by using a first FID stored in the broadcast queue controller and storing a value of a Next field of the transmission frame in the first FID of the broadcast queue controller; and b4) if the transmission frame is determined to be transmitted to the mobile terminal on the PCF service, the CF queue controller transmitting the transmission frame stored in the transmission frame buffer to the wireless physical layer in an ascending order of association identifiers (AID) of the mobile terminal by referring to the CF queue table.

15. The method as recited in claim 14, wherein the step b4) includes the steps of:

b5) the CF queue controller examining an entry corresponding to the AID of the CF queue table and confirming values of FID and response (Ctrl) fields;

b6) if the value of the frame identifier (FID) is '0' and the response (Ctrl) field indicating that the mobile terminal is CF POLL-responsive, transmitting a value of POLL frame identifier (PFID) to the buffer controlling means and the buffer controlling means transmitting a POLL frame in the location of the POLL frame identifier (PFID) of the CF POLL frame buffer to the wireless physical layer;

b7) the CF queue controller transmitting the values of the FID field and the PFID field to the buffer controller, and the buffer controller transmitting the values of the FID and PFID fields by piggybacking a POLL frame of the CF POLL frame buffer to a value of the MPDU field of the transmission frame structure of the transmission frame buffer; and b8) storing a value of the Next field of the transmission frame structure in a FID field of the CF queue table.

* * * * *